United States Patent [19]
Wiegand

[11] 3,810,994
[45] May 14, 1974

[54] METHOD AND COMPOSITION FOR TREATING OBESITY

[75] Inventor: Karl E. Wiegand, Baton Rouge, La.

[73] Assignee: Ethyl Corporation, Richmond, Va.

[22] Filed: June 1, 1972

[21] Appl. No.: 258,655

[52] U.S. Cl. .............................................. 424/316
[51] Int. Cl. .......................................... A61k 27/00
[58] Field of Search ................................... 424/316

[56] References Cited
FOREIGN PATENTS OR APPLICATIONS

| 4,465M | 9/1966 | France | 424/316 |
|---|---|---|---|
| 639,532 | 5/1964 | Belgium | 424/316 |
| 5,100M | 5/1967 | France | 424/317 |

OTHER PUBLICATIONS

Merck Index, 8th Edition, 1968, p. 212.

*Primary Examiner*—Albert T. Meyers
*Assistant Examiner*—Norman A. Drezin
*Attorney, Agent, or Firm*—Donald L. Johnson; John F. Sieberth; James M. Pelton

[57] ABSTRACT

A method and therapeutic composition for the treatment of obesity by internal administration in unit dosage form of carnitine or a suitably active derivative thereof. For example, carnitine may be administered either alone, or with another weight reducing preparation, or in the course of a restricted caloric dietary program for treatment of obesity.

4 Claims, No Drawings

METHOD AND COMPOSITION FOR TREATING OBESITY

BACKGROUND OF THE INVENTION

Carnitine is a well-known chemical found naturally in the body. Its synthesis and use have been widely studied. It is usually produced synthetically as a racemic mixture. For example, Japanese Patent 5172 of 1962 teaches the preparation of carnitine hydrochloride by heating a mixture of ethyl-4-chloro-3-hydroxybutyrate and a 27 percent trimethylamine solution for about 7 hours, evaporating the resulting product, adding 10 percent HCl to the residue and evaporating the resultant solution to give carnitine hydrochloride. A companion patent, Japanese Patent 5171 of 1962, teaches the preparation of carnitine hydrochloride by adding to a warm aqueous solution of trimethylamine hydrochloride sufficient epichlorohydrin to give 3-chloro-2-hydroxypropyltrimethylammonium chloride after stirring for about 1 hour. This product is dissolved in aqueous methanol and an aqueous solution of sodium cyanide is added dropwise to the mixture. The solution is adjusted to pH 5 with 6 N HCl. The mixture is then cooled, filtered and the filtrate evaporated in vacuuo to give 3-cyano-2-hydroxypropyltrimethylammonium chloride. On heating with concentrated HCl and adding water the mixture is then neutralized with 6 N sodium hydroxide, filtered with active carbon and filtrate evaporated in vacuuo to produce carnitine hydrochloride.

Carnitine, normally present in the body, enzymatically combines with fatty acids to facilitate their transport through the mitochondrial membranes and thus aid in metabolism of fatty acids, Yalkowsky, Samuel H., *Pharmaceutical Society* 1970, volume 59 (6) page 798. According to a publication by Toshio Umetani of the Osaka City University Medical School, 1969, carnitine is eliminated in the urine of healthy individuals at the rate of about $47.8 \pm 11.7$ mg in 24 hours. French Medical Patent 4465, issued Nov. 2, 1966 indicates that the compound is safe as one would expect because it is normally present in the body. Daily oral doses of 0.5 grams per kilogram of body weight in rats did not cause death. The French patent further indicates that racemic carnitine hydrochloride together with tribasic lysine citrate and vitamin C is useful in treating anorexia and asthenia in pharmaceutical formulations.

Although the role of carnitine in the body is fairly well understood and its use in the treatment of various disorders has been shown to be beneficial, the literature does not disclose the use of carnitine as a therapeutic composition in a method for treating obesity. It is the object of this invention to provide a therapeutic composition and method for treating obesity employing carnitine in a pharmaceutically acceptable carrier. A further object of this invention is the method for treating obesity including in a restricted daily caloric dietary program internally administered amounts of carnitine. Further objects will be readily apparent from the following description of the invention.

SUMMARY OF THE INVENTION

The invention relates to treating obesity in mammals using supplemental carnitine. Thus the invention provides a method of treating a mammal for obesity comprising internally administering an amount of carnitine sufficient to increase the metabolism of fatty acids in the mammal. Further, this invention relates to compositions useful for treating mammals for obesity. Therefore, the invention provides a therapeutic composition for treating a mammal for obesity said composition comprising an internally administerable pharmaceutical carrier and an internally administerable fatty acid metabolism increasing amount of carnitine. The composition can be used in any suitable form and administered as most convenient, preferably by oral administration of the pharmaceutical carrier and carnitine in capsule or tablet form. A particularly preferred method of treating humans for obesity comprises supplementing a restricted caloric dietary program with from 0.1 to about 50 mg per kilogram of body weight per day of carnitine.

PREFERRED EMBODIMENTS OF THE INVENTION

The compositions useful in this invention comprise carnitine and its suitably active derivatives. Carnitine (beta-hydroxy-gamma-trimethylammonium butyrate), although known in two optically active forms, L- and D-carnitine, is normally present in the body as the L-isomer which is preferred. Synthetic preparations usually produce a racemic mixture of carnitine. In addition to the pure compound or mixtures of its optically active isomers, derivatives of carnitine may be employed with the same effects. For example, salts, esters, nitriles and similar compounds are typical. Salts such as the halides, specifically, fluoride, iodide, bromide and preferably the chloride are useful. In a particularly preferred form esters of carboxylic acids may be used. Illustrative are the acetic, propionic, valeric, caproic, heptanoic, and similar acid esters of carnitine. Although the fatty acid esters may also be employed, their use places an added burden on metabolism of fatty acids by the body. Illustrative of the fatty acid esters are esters of lauric, myristic, palmitic, stearic and similar acids. Acyl- and acetylcarnitine and their derivatives are also useful compounds for this invention. Moreover, the acyl- and acetylcarnitine can be used as their salts or esters as indicated above. Another related compound useful in this invention is the diester of the carnitine molecule, bicarnisine. It will be recognized by those skilled in the art that not only may the above compounds be useful but also any of the known pharmaceutically active derivatives or precursors of carnitine may also be employed.

As indicated in the Background of the Invention carnitine and its derivatives are known and methods for their preparation are documented in literature. Commercial practice is to prepare the racemic mixture of carnitine which may be employed in this invention. If desired the racemic mixture may be resolved using an optically active agent to precipitate the desired isomer, separating the precipitant formed and regenerating the desired D- or L-carnitine isomer. The product is a solid material which is soluble in alcohol and ether and only slightly soluble in water.

The compounds of this invention are well known for their role in metabolism of fatty acids. Carnitine and its above derivatives are normally present or available from food sources for use in the body as an aid in oxidation of fatty acids. Their role is to esterify fatty acids and aid in their transport across the mitochondrial membrane for subsequent de-esterification and oxidation in the mitochondria. From about 35 to 60 mg per day of carnitine is eliminated by the body. Replacement is required through external sources to continue metabolism of fatty acids on a normal basis. Without being limited to any particular theory of operation or mechanism by which the invention operates, it is believed that increasing the carnitine level in the body effectively increases oxidation of fatty acids and causes a corresponding decrease in the amount of fatty acid left for storage in the body. Therefore supplemental amounts of carnitine may effectively increase the metabolism of fatty acid and prevent build-up of body weight. Further, additional amounts of carnitine not only prevent build-up of body weight but cause weight reduction by the increased metabolism of fatty acids. The effect of additional amounts of carnitine is especially useful in a reduced caloric dietary program. In such a dietary program the fatty tissue stored is released for metabolism. A certain amount of ketones and aldehydes are also produced in this situation causing some discomfort during the restricted dietary regimen. The addition of carnitine not only aids in oxidation of the fatty acids but also decreases the discomfort associated with the ketone and aldehyde production and thus aids in the objective of treating obesity.

The use of carnitine for treating obesity may be combined with a restricted caloric dietary program or with any of the well known weight reducing agents with which one skilled in the art is familiar. For example, the following compounds are typical: diethylpropion, phenmetrazine, phentermine, chlorphentermine, benzphetamine, d-amphetamine, prochlorperazine, d-methamphetamine, and similar stimulants alone or in combination with depressants such as prochlorperazine, methaqualone, meprobamate, amobarbital, phenobarbital and other similar tranquilizer or barbiturates as well as vitamines such as riboflavin, thiamine or pantothenic acid. Any of the foregoing are useful weight reducing agents or dietary aids and when combined with carnitine provide preferred method for treating obesity.

The amount of carnitine which may be used is that sufficient to aid in reduction of body weight when administered by itself or as a suitable pharmaceutical composition, either alone or with another weight reducing agent or as a part of a restricted caloric dietary program. Generally, the amount of carnitine should exceed the normal daily requirements for metabolism of fatty acids. Preferably the amount should be sufficient to increase the metabolism of fatty acids. A preferred amount of carnitine is in the range of from about 0.1 to about 50 mg per kilogram of body weight per day. In a more preferred embodiment of this invention the amount of carnitine is in the range of from about 1 to about 50 mg per kilogram of body weight per day with a most preferred amount of carnitine being in the range of from about 1 to about 25 mg per kilogram of body weight per day.

In another aspect of this invention there is provided a therapeutic composition for treating a mammal for obesity the composition comprising an internally administerable pharmaceutical carrier and a fatty acid metabolism increasing amount of carnitine. The compositions are administered internally and may be parenterally or orally administered, the latter being preferable. The compounds of this invention are generally solid at room temperature and for oral administration pharmaceutical preparations of this invention may be made following conventional techniques of the pharmaceutical chemist. These techniques involve granulating and compressing when necessary or variously mixing and dissolving or suspending the ingredients as appropriate to the desired end product. Numerous pharmaceutical forms to carry the compounds can be used. For example, the pure compound can be used or it can be mixed with a solid carrier. Generally, inorganic pharmaceutical carriers are preferable and particularly solid inorganic carriers. One reason for this is the large number of pharmaceutically acceptable inorganic materials which are known to be pharmaceutically safe and acceptable, as well as very convenient in preparing formulations. The compositions may take the form of tablets, linguets, powders, capsules, slurries, troches or lozenges, prepared by standard pharmaceutical techniques. Tablet compositions may be coated or uncoated and they may be effervescent or noneffervescent. Conventional excipients for tablet formations may be used. For example, inert diluents, such as magnesium carbonate or lactose, disintegrating agents such as maize starch or alginic acid, and lubricating agents such as magnesium stearate may be used. A suitable ion-exchange resin may be employed as the carrier, for example, sulfonated polystyrene, ion-exchange clays, amino substituted polyacrylates or polyacrylamides or similar commercially available ion-exchange resins may be used to achieve sustained release characteristic in carnitine administration. A preferable tablet composition is one which comprises from about 10 to about 500 milligrams of carnitine.

If a liquid carrier is used, the preparation may be in the form of a soft gelatin capsule, a syrup, a liquid solution or suspension. Most of the compounds of this invention are only slightly soluble in organic liquids, particularly alcohols, if at all, but generally soluble in aqueous solutions, at least to some extent. In general those derivatives of carnitine having greater hydrocarbon substitution are less soluble in water. The hydrocarbon solubility of most of the compounds of this invention is high enough to allow the use of various pharmaceutically-acceptable oils as carriers. For example vegetable or animal oils such as sunflower oil, safflower oil, maize oil or codliver oil can be used. Glycerine can also be used. With these latter solvents, from 25–30 percent water may be added. When water alone is the carrier, the preparation can be administered in the form of a sterile saline solution.

Emulsion compositions may be formulated using emulsifying agents such as sorbitan tri-oleate, polyoxyethylene sorbitan monooleate, lecithin, gum acacia or gum tragacanth. Aqueous based suspensions or solutions may be prepared with the aid of wetting agents such as poly-ethylene oxide condensation products of alkylphenols, fatty alcohols or fatty acids and with suspending agents, for example a hydrophilic colloid such as polyvinylpyrrolidene. The emulsions and suspensions may contain conventional excipients such as sweetening agents, flowing agents, coloring materials and preservatives.

The compounds of this invention may be administered in the form of a nutritive preparation in which the mixture of active ingredients is mixed with proteins, such as casein and carbohydrates. In addition to the active ingredients, dietary supplements such as vitamins, salts of glycerophosphoric acid, choline, inositol and amino acids such as methionine may be added.

The percentage of carnitine in the pharmaceutical carrier may be varied. It is necessary that the carnitine constitute a proportion such that a suitable dosage will be obtained. It is therefore preferred to use pharmaceutical compositions containing at least 10 weight percent of the carnitine. Activity increases with concentration of the agent in the carrier, but those compositions containing a significant amount of carrier, e.g. at least 1 percent and preferably at least 5 percent, are preferred as they allow for the easier administration of the carnitine.

For parenteral use, the compounds of this invention can be formulated with sterile ingredients, compounded and packaged aseptically. They may be administered intravenously or intramuscularly. Useful solvents for formulation in such use are sterile aqueous solutions. Up to 25–30 percent by volume of water may be incorporated in the vehicle if desired. Especially satisfactory are the pharmaceutically acceptable saline solutions. A pH range, about 7.4 and isotonicity compatible with body isotonicity is desirable. Basicity may be controlled by addition of a base as required, and a particularly convenient base is monoethanolamine. It may often be desirable to incorporate a local anesthetic and such are well known to those skilled in the art. For example, lidocaine ($\beta$-di-ethylamine-2,6-acetoxylidide, such as that commercially available from the Astra Chemical Co.), may be employed at a level of up to about 20 mg/cc, or even more.

Administration of the compounds of this invention by the oral route is preferred. Advantageous daily dosages can be as low as 10 mg for a human. There is, of course, no clear cut upper dosage limit since the compounds are generally non-toxic and have no untoward side effects. The maximum amount that can be taken must therefore be limited only by physical limitations on the quantity of non-nutritional material that can be digested. A convenient upper limit is about 500 mg per person per day. A preferred range of daily dosage is about 50 to 250 mg. In terms of body weight, advantageous dosages are from 0.1 to 50 mg per kg of body weight per day with a preferred range of about 1 to 50 mg per kg of body weight per day. Most preferably, a range of from about 1 to 25 mg per kg per day may be employed. The daily dosage is preferably administered from one to four or five times daily in amounts of from about 10 mg to about 500 mg, and these amounts are administered in dosage units containing at least 2 mg of the carnitine. For example, when administrating the compound in tablet form several tablets containing from say 2 to 5 mg of the active compound can be administered, up to 4 or more times daily. Alternatively, larger dosage units containing more of the carnitine, say 5 to 250 mg, can be administered at less frequent intervals.

For parenteral applications daily dosages of about one-tenth of that used for oral treatment are advantageous. Thus daily dosages can be as low as 1 mg for a human, i.e. 0.01 mg per kg of body weight. The maximum dosage is determined only by physical limitations. A convenient upper limit is about 50 mg. From about 1 to about 10 mg per injection (dosage unit) in concentrations of about 1 to 50 mg/cc, with from 1 to 3 injections of from 1 cc to 10 cc daily will give the required amount. Preferred formulations will contain from 10 to about 50 mg/cc to be given in one injection of from 1 cc to 5 cc.

The oral or parenteral dose may be individually determined by the physician or veterinarian. Larger or smaller doses can be used and, in some cases, might be preferred in individual cases. Likewise administration need not be on a daily basis, although this is preferred, but may be, for example, on alternate days or even weekly and the like. With either oral or parenteral treatment a daily regimen is preferred. However, even a single administration can be used.

The safety of carnitine is unquestioned since it is a compound occurring naturally in the body. In feeding studies of rats, as indicated in the Background of the Invention, a 5-10 g/kg dose did not cause death. This is much higher than the dosage proposed for treatment of obesity in humans.

I claim:

1. A method of treating an obese animal or person for obesity comprising internally administering an amount of from about 0.1 to about 50 milligrams per kilogram of body weight per day of carnitine.

2. A method of claim 1 wherein said carnitine is administered orally.

3. A method of claim 2 wherein said amount of carnitine is in the range from about 1 to about 50 mg per kilogram of body weight per day.

4. A method of claim 2 wherein said amount of carnitine is in the range of from about 1 to about 25 mg per kilogram of body weight per day.

* * * * *